(No Model.) 5 Sheets—Sheet 1.

J. W. RAMSDEN & H. S. ELLIS.
SEWING MACHINE.

No. 357,334. Patented Feb. 8, 1887.

Witnesses
Jos. S. Palmer
Jos. H. Blackwood

Inventors
John W. Ramsden &
Harry S. Ellis
By their Attorney
Wm. R. Doolittle (No Model.) 5 Sheets—Sheet 2.

J. W. RAMSDEN & H. S. ELLIS.
SEWING MACHINE.

No. 357,334. Patented Feb. 8, 1887.

Witnesses
Jos. S. Latimer
Jos. H. Blackwood

Inventors
John W. Ramsden &
Harry S. Ellis
By their Attorney
Wm. H. Doolittle (No Model.) 5 Sheets—Sheet 3.

J. W. RAMSDEN & H. S. ELLIS.
SEWING MACHINE.

No. 357,334. Patented Feb. 8, 1887.

(No Model.) 5 Sheets—Sheet 4.
J. W. RAMSDEN & H. S. ELLIS.
SEWING MACHINE.
No. 357,334. Patented Feb. 8, 1887.
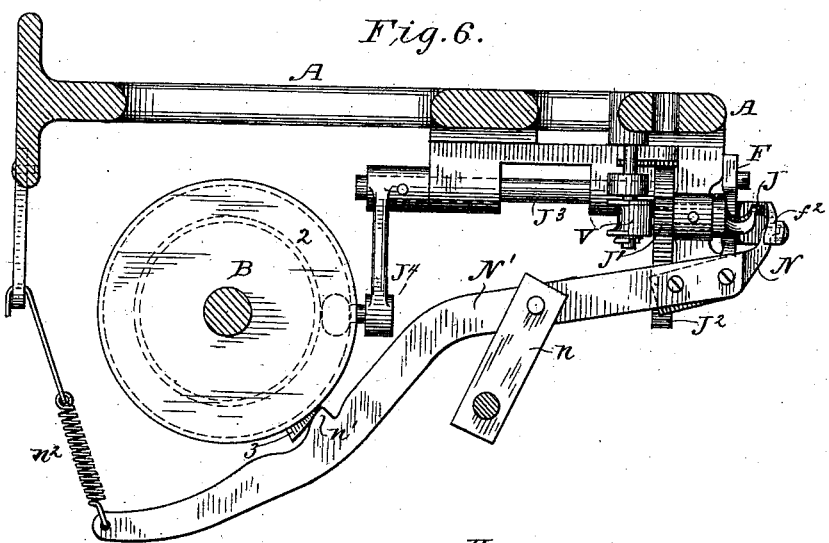
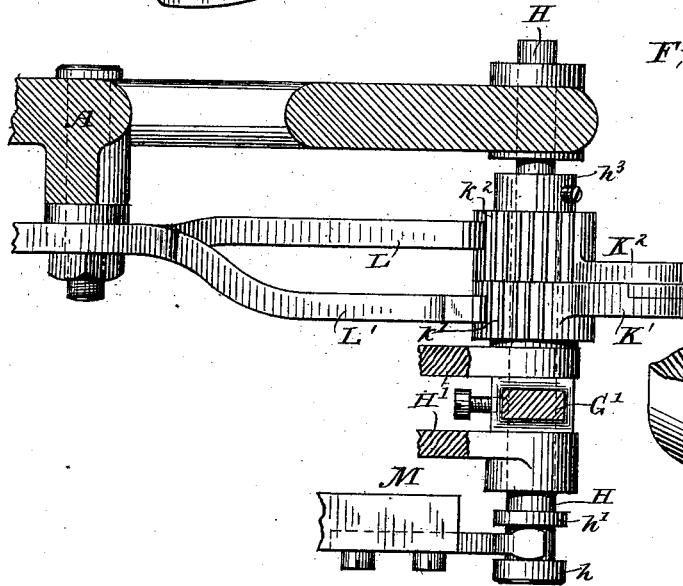
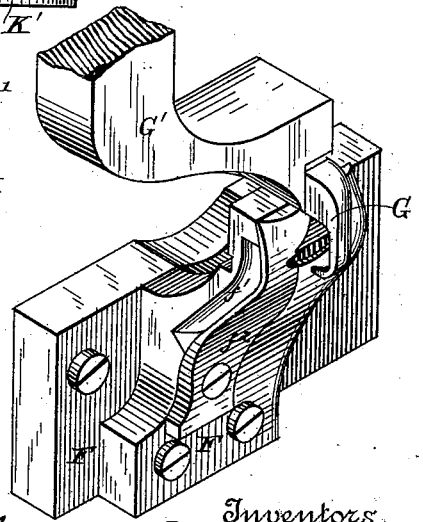

(No Model.) 5 Sheets—Sheet 5.

J. W. RAMSDEN & H. S. ELLIS.
SEWING MACHINE.

No. 357,334. Patented Feb. 8, 1887.

Witnesses
Jos. S. Latimer
Jos H Blackwood

Inventor
John W. Ramsden &
By their Attorney Harry S. Ellis
Wm H Doolittle

UNITED STATES PATENT OFFICE.

JOHN WILLIAM RAMSDEN AND HARRY SENIOR ELLIS, OF LEEDS, COUNTY OF YORK, ENGLAND.

SEWING-MACHINE.

SPECIFICATION forming part of Letters Patent No. 357,334, dated February 8, 1887.

Application filed September 7, 1885. Serial No. 176,409. (No model.) Patented in England August 25, 1885, No. 10,042; in France August 27, 1885, No. 170,872; in Germany August 30, 1885, No. 37,078, and in Austria April 21, 1886, No. 43,449.

*To all whom it may concern:*

Be it known that we, JOHN WILLIAM RAMSDEN and HARRY SENIOR ELLIS, subjects of the Queen of Great Britain and Ireland, residing at Leeds, in the county of York, Kingdom of Great Britain and Ireland, engineers, have invented new and useful Improvements in Sewing-Machines, (which have been patented as follows: Great Britain, August 25, 1885, No. 10,042; France, August 27, 1885, No. 170,872; Austria, April 21, 1886, No. 43,449; Germany, August 30, 1885, No. 37,078,) of which the following is a specification.

Our invention relates to improvements in sewing-machines of the kind in which two waxed threads are used by means of a hooked needle and a shuttle operating above the work or material.

Figure 1:
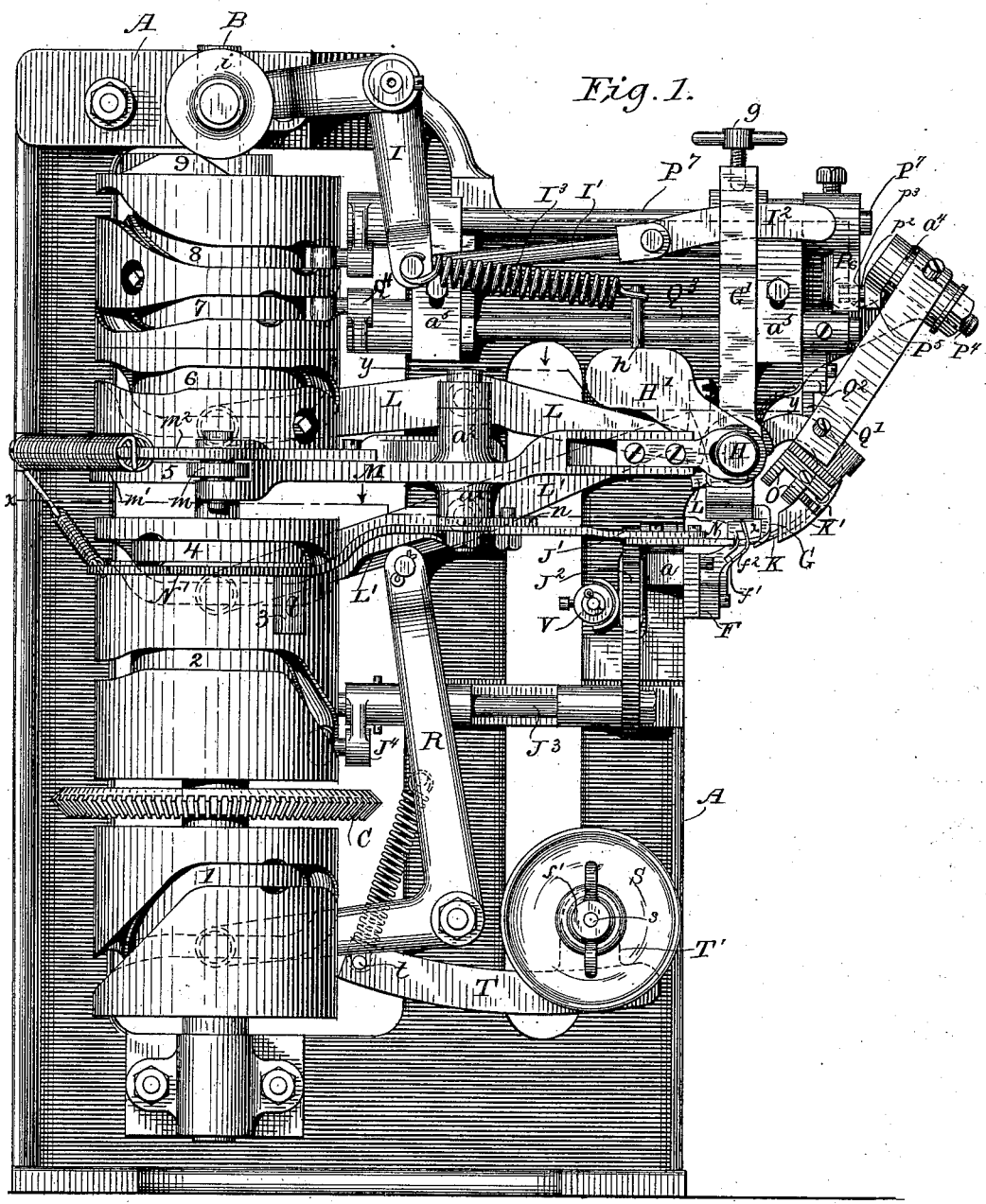
Figure 2:
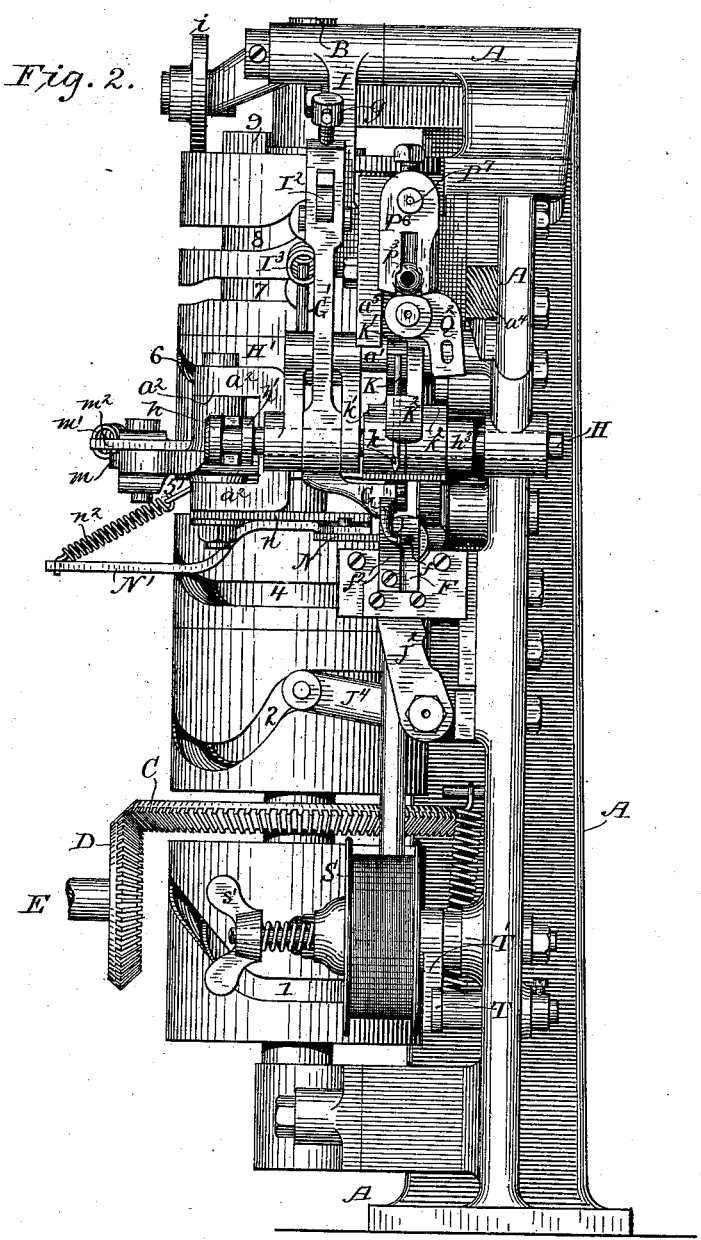
Figure 3:
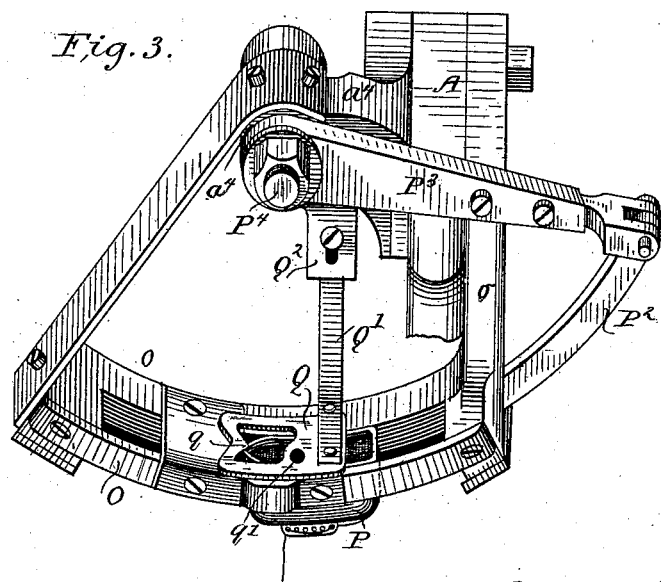
Figure 4:
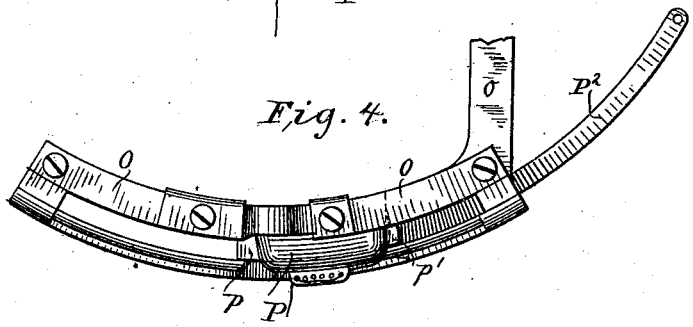
Figure 5:
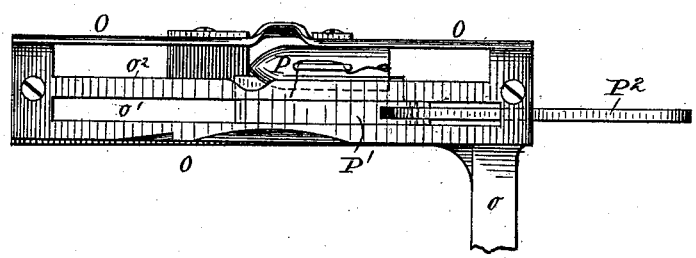
Figure 9:
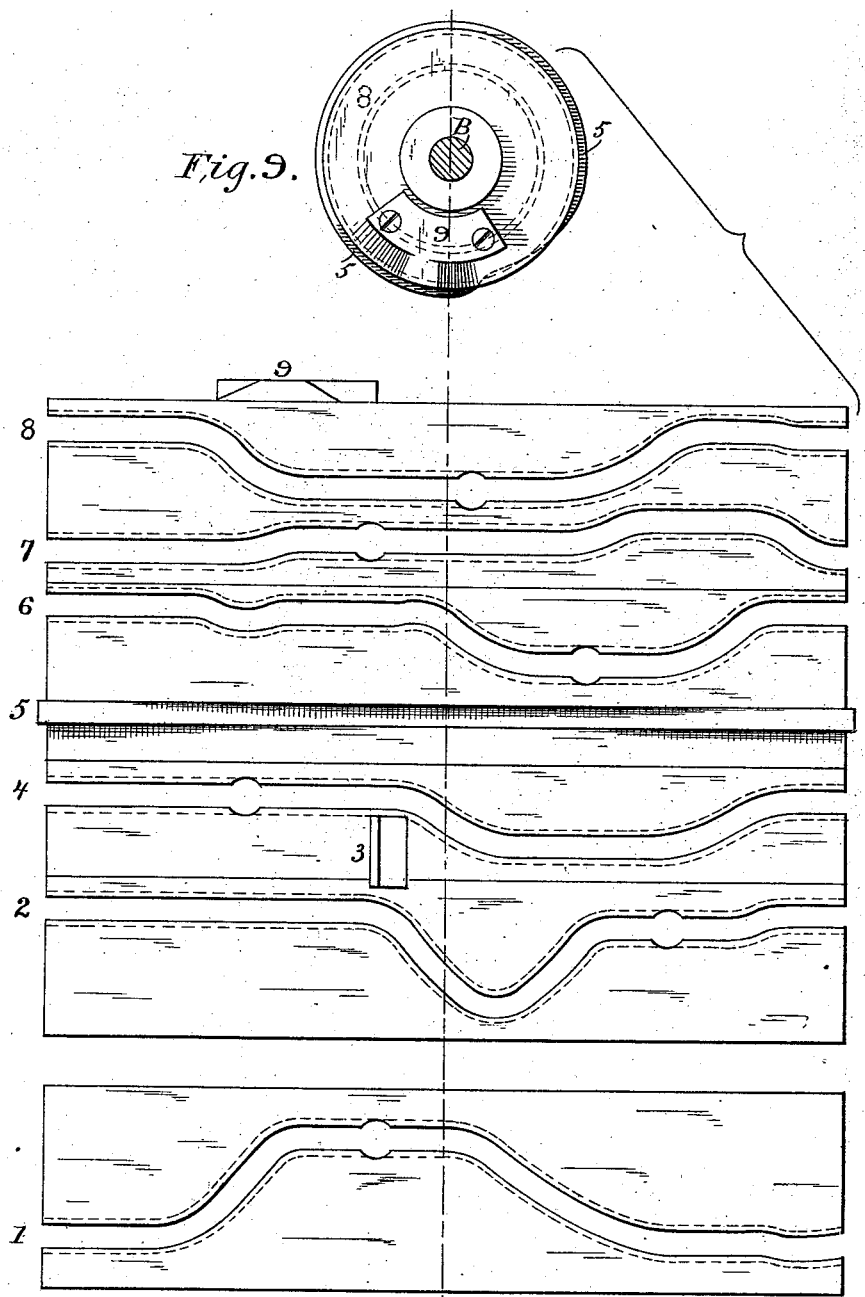

In the accompanying drawings, which illustrate our invention, Figure 1 is a side elevation of the machine, the needle being at full stroke. Fig. 2 is a front elevation of the machine with the shuttle-race and loop-divider removed and the needle raised. Fig. 3 is a perspective view of the shuttle-race and shuttle and the loop-divider. Fig. 4 is a side view of the shuttle-race and shuttle, and Fig. 5 is a bottom plan of the same. Fig. 6 is a horizontal section taken on the line $x\ x$, Fig. 1, illustrating the looper mechanism and the needle-support. Fig. 7 is also a horizontal section taken on the line $y\ y$, Fig. 1, illustrating the mechanisms for operating the needle-holder and the needle-guide. Fig. 8 is a detail perspective view of the stitching-cap, welt-guide, and hooked presser-foot. Fig. 9 shows the development of the actuating-cams.

In Letters Patent of the United States No. 348,474, granted to us on the 31st day of August, 1886, we have described a machine using a hooked needle, a loop dividing and stripping plate, and a reciprocating shuttle for the purpose of closing boot-uppers, belts, harness, and other work that permits of a straight needle being used.

The object of our present invention is to modify certain parts of the apparatus described in the specification of the aforesaid patent and shown in the drawings accompanying the same, and to combine them with certain other mechanism, so as to adapt this class of sewing-machines for the manufacture of welted boots and for "pumps" or turn-shoes. To sew this class of work upon the last it is necessary to have more room to bring the work under the action of the needle than can be obtained in a straight-needle machine, such as described and shown in the patent above referred to. To this end we make use of a curved needle, and the reciprocating shuttle, instead of working in a flat or straight race at right angles to the needle, works in a race forming an arc of a circle so disposed as to be nearest the work at the point where the shuttle crosses the path of the needle, the ends of the shuttle-race being consequently farthest away from the work, so as to give greater facilities for the boot under treatment to be brought under the action of the needle.

Referring to the accompanying drawings, A represents the frame-work of the machine, designed to be mounted upon a suitable supporting-table. (Not shown.)

B is the main shaft, upon which are secured the cams and cam-grooves 1 2 3 4 5 6 7 8 9, which effect the several motions. This shaft rotates in bearings in frame A, and is actuated by a bevel-wheel, C, secured thereon, gearing with another bevel-wheel, D, on the power-shaft E, mounted in suitable bearings (not shown) on the supporting-table.

F represents the stitching-cap, secured to a projection, $a$, from frame A. This cap is slotted horizontally, as at $f$, Fig. 2, to permit a sidewise motion of the needle to effect the feed of the work, as will be more fully explained farther on, and just to the left of this slot the cap is recessed, as at $f'$, which recess is covered by a thin narrow plate, $f^2$, Figs. 1 and 2, for guiding the welt into position for being sewed to the insole of a boot.

G represents a hooked presser-foot for holding the work against the stitching-cap. (Seen in Figs. 1, 2, and 8.) The presser-foot is attached to a lever, G', which has its center of motion on the axis H, the outer end of which has its bearing in frame A, its inner end being journaled in a bifurcated lug, H', secured to a projection, a', extending inwardly from the frame-work of the machine, as seen in Fig. 2. The presser-foot being hook-shaped, as shown, when in operation its forwardly-projecting portion will engage the work close alongside the welt-guide between the latter and the path of the needle, and thus keep the welt at all times smooth and even.

Lever G' receives motion to cause the presser-foot to clamp and release the work at the proper times through cam 9, a bell-crank lever, I, provided with a friction-wheel, $i$, rod I', and sector I$^2$, the latter passing through the upper slotted end of lever G', and being secured by a set-screw, $g$, by which construction the presser-foot may be adjusted to suit the thickness of the material being sewed. A coiled spring, I$^3$, one end of which is attached to a pin in lug H' and the other end to the bell-crank, serves to keep friction-wheel $i$ in close contact with the cam, thus insuring prompt action of the lever carrying the presser-foot.

Immediately behind the stitching-cap F is a rotating looper, J, through a longitudinal perforation in which passes the thread for forming the loop. The looper is journaled in a bearing on top of the projection $a$ of the frame, and has a toothed wheel, J', formed on its rear end, which wheel meshes with a toothed sector, J$^2$, on the front end of a shaft, J$^3$, which, through the medium of an arm, J$^4$, and cam 2, is rocked back and forth, thus revolving the looper.

K represents the curved needle, near the point of which is formed a hook, $k$, as seen in Fig. 2; and K' is the needle-holder, whose rear end is formed into a toothed sector, $k'$, which is secured to axis H, as clearly seen in Fig. 7.

K$^2$ is the needle-guide, whose rear end is also formed into a toothed sector, $k^2$, loosely mounted on axis H alongside the needle-holder, and being held in that position by a collar, $h^3$, as shown in Fig. 7. The front portion of this guide is curved in accordance with the curvature of the needle-holder, and at the end it is of a width sufficient to receive the needle through a perforation therein, as seen in Fig. 2.

The needle-holder and the needle-guide are operated independently of each other by pivoted levers L L', formed with toothed racks at their front ends, lever L, which operates the needle-holder, being in engagement with cam 6, and lever L', operating the needle-guide, engaging with cam 4, as shown in Fig. 1. The movements of the needle-holder and the needle-guide are so regulated that the guide accompanies the needle until the two approach the work, when the motion of the guide is arrested, while the needle advances and pierces the work.

While the needle is in the work the axis H, upon which the needle-holder and the needle-guide are mounted, has an endwise movement imparted to it by means of a lever, M, pivoted in a bracket, $a^2$, extending from frame A. The front end of this lever is forked and engages the axis between collars $h\ h'$ thereon, as seen in Figs. 2 and 7, while its rear end bears a friction-wheel, $m$. This wheel is held in engagement with cam 5 by means of a coiled spring, $m'$, one end of which is secured to an extension, $m^2$, of the lever M and the other end to frame A. Through this movement of the axis there is thus imparted a sidewise movement to the needle to feed the work forward, and in order that the needle may be sustained through such sidewise motion, and that each movement may be regular, we have provided a finger, (best seen in Fig. 6,) N, which presses against the needle just above the hook as it projects through the work and the stitching-cap F, as shown in Fig. 1. This finger is attached to a lever, N', fulcrumed on a plate, $n$, Fig. 6, bolted to the under side of bracket $a^2$, as seen in Fig. 1, the said lever having formed upon it a projection, $n'$, for engagement with cam 3, the lever being held in contact with said cam by a coiled spring, $n^2$. (All clearly shown in Fig. 6.)

O represents the curvilinear shuttle-race, secured in position by bolts passing through its arm $o$ into frame A, as shown in Fig. 3. It will be observed that the shuttle-race is so positioned as to be nearest the work at the point where the shuttle, which works at right angles to the needle, crosses the path of the needle, and that consequently the ends of the race are farthest away from the work, whereby ample room is afforded for the manipulation of the boot or other article being operated upon.

P is the shuttle, which, as seen in Figs. 3 and 4, is curved to the same radius as the segmentally-formed shuttle-race in which it works, and is centrally pointed, as seen in Figs. 3 and 5. It is reciprocated in the race by the shuttle-carrier P', which, as seen in Fig. 5, is guided and steadied in its movements by the walls of slot $o'$ in the race. A portion of the carrier overlies the bottom plate, $o^2$, of the race, as seen in dotted lines in Fig. 5, and is formed with lugs $p\ p'$, for engagement with the front and rear ends of the shuttle, as shown in full lines in Fig. 4. As will be seen in the drawings, this carrier is pivotally attached to one end of a curved link, P$^2$, whose other end is also pivotally connected with a radial arm, P$^3$, secured on a short shaft, P$^4$, carried in a sleeve-bracket, $a^4$, secured to and curved inwardly from frame A, as seen in full and dotted lines in Fig. 1, and to the rear end of said shaft is rigidly secured a short arm, P$^5$, provided with a horizontally-projecting pin, $p^2$, which enters a small metallic ball, $p^3$, seated in a bifurcated arm, P$^6$, (see Fig. 2,) removably secured to a shaft, P$^7$, mounted in brackets $a^5\ a^5$, screwed to frame A, the said shaft being rocked by cam 8, as seen in Fig. 1.

We use a cop of thread in the shuttle, as described in our former patent herein referred to.

Immediately above what may be termed the "upper face" of the curvilinear shuttle-race, and working reciprocally in the same inclined plane, or nearly so, is a loop dividing and stripping plate, Q, similar in construction to that described in our former patent above alluded to. This plate is secured to one end of an arm, Q', whose other end is adjustably attached to a curved sleeve, $Q^2$, Figs. 1, 2, and 3, secured to the front end of a shaft, $Q^3$, mounted in bearings (not seen) in frame A, the other end of said shaft being provided with a rock-arm, $Q^4$, in engagement with cam 7, whereby the proper reciprocating movements are imparted to the loop dividing and stripping plate.

The stitch-tightening device consists simply of a bell-crank lever, R, pivoted to frame A and deriving motion from cam 1, the looper-thread being taken from a reel, S, mounted on a pin, $s$, extending from the frame, on the outer end of which pin there is a thumb-nut, $s'$, for clamping the reel more or less tightly against the frame, and as an additional friction device for the reel we employ a lever, T, pivoted at its front end to the frame and provided with a brake-shoe, T', (shown in dotted lines in Fig. 1 and in full lines in Fig. 2,) which engages with the hub of the reel. A pin, $t$, passes through the rear end of the lever, upon the inner end of which pin rests the horizontal arm of the bell-crank, and to the outer end of which one end of a spiral spring is attached, the other end being secured to the frame. The thread is led from the reel through a bath of wax below the supporting-table, (not shown,) thence up to and over a spool, V, Fig. 1, thence rearward under and over the pin in the upper end of the vertical arm of the bell-crank, and then forward and through the perforation in the looper.

When sewing in the welt of welted boots through the upper-leather to the insole, the boot is lasted and prepared for the machine in a manner as nearly as can be to that required when the welt has to be sewed in by hand—that is to say, the insole is beveled on the outer edge and flanged. In sewing work of this description with our machine, it is clamped to the stitching-cap F by the presser-foot G, the welt having been passed under the welt-guide $f^2$. Power being then applied to shaft B, motion is imparted, through cams 4 and 6 and levers L and L', to the needle-holder K' and the needle-guide $K^2$. When the guide has approached to within a short distance of the work under treatment, its motion ceases, while that of the needle and its holder continues until the work is pierced, the needle in the meantime being supported by the now stationary guide. While the needle is in this position, with its hook through the work, the rotating looper J throws a thread into the hook, when an endwise motion is, by lever M and cam 5, imparted to the axis H (carrying the needle-holder and the needle-guide) to effect the feed of the work forward. At the same time that this endwise motion of axis H is taking place, and in order to assist the needle in feeding the work along, the finger N is caused to approach that part of the needle which projects through the work and the stitching-cap. This finger bears against the needle immediately above the hook, and moves horizontally with the same velocity as the needle, to prevent any springing and to secure regularity in the feed motion. As described, the needle, having had thread introduced into its hook by the rotating looper, retires and draws the loop of thread through the work. The hooked needle, having by its retirement drawn the loop of thread through the work, slightly advances, and thus slackens the loop, and at the same time the pointed projection $q$ of the dividing and stripping plate Q, Fig. 3, advances toward the needle. This pointed projection then enters between the threads—that is, the two opposite parts of the loop—and forces them farther apart, so as to permit the now advancing shuttle to enter and pass freely through the loop. Immediately this has been effected, the plate Q is moved slightly to the left and the needle advances again, this time with its point and hook just within a small hole, $q'$, in rear of the opening in the stripping-plate, when the loop, coming in contact with the narrow web of the plate between the opening and hole $q'$, is stripped out of the needle-hook. The needle, its holder, and its guide then again retire, and the stitch is drawn into the work by the stitch-tightening device R. In the meantime the axis H, carrying the needle and its guide, is caused to return to its normal position, ready to commence another stitch, and the same cycle of operations is repeated for each stitch.

Having thus described the construction and operation of our machine, what we claim as new, and desire to secure by Letters Patent of the United States, is—

1. In a waxed-thread sewing-machine, a curved hooked needle, a curvilinear or segmentally-formed shuttle-race located above the work and crossing the path of the needle on a line at a right angle thereto, and a curved shuttle traveling in said race, the whole combined and operating substantially in the manner above set forth.

2. In a waxed-thread sewing-machine, a curved hooked needle, a curvilinear or segmentally-formed shuttle-race located above the work and crossing the path of the needle on a line at a right angle thereto, a curved and centrally-pointed shuttle traveling in said race, a revolving looper, and a dividing and stripping plate reciprocated above the upper face of the shuttle-race and in the same or nearly the same inclined plane, the whole combined and operating in the manner substantially as above set forth.

3. In a waxed-thread sewing-machine, the combination, with a transversely-movable axis, a needle-holder mounted on said axis, a curved hooked needle secured in said holder, and a transversely-slotted stitching-cap, of a transversely-movable finger engaging with the needle after it has pierced the work and supporting it during its sidewise motion in feeding the work, substantially as described.

4. In a waxed-thread sewing-machine, the combination, with a transversely-movable axis, a needle-holder mounted on said axis, a curved hooked needle secured in said holder, a curvilinear or segmentally-formed shuttle-race arranged above the work and transversely of the path of the needle, a shuttle traveling in said race, a revolving looper, and a loop dividing and stripping plate, of a stitch-tightening device operating to tighten the stitch after the feed of the work has taken place and the loop has been stripped from the needle, substantially as described.

5. In a wax-thread sewing-machine, the combination, with the stitching-cap having an opening for the passage therethrough of the needle and a welt-guide, of the adjustable hooked presser-foot, as set forth.

JOHN WILLIAM RAMSDEN.
  HARRY SENIOR ELLIS.

Witnesses:
  THOS. E. CRAVEN, *C. E.*,
*Fellow of Inst. Patent Agents, 24 Victoria Chambers, Leeds.*
  WILLIAM SADLER,
   *North Street, Leeds.*